(12) United States Patent
Varga et al.

(10) Patent No.: US 9,639,792 B2
(45) Date of Patent: May 2, 2017

(54) RESOLUTION OF OUT OF MEMORY CONDITIONS FOR SHARED MEMORY IN A PRINT CONTROLLER

(75) Inventors: John T. Varga, Longmont, CO (US); David Ward, Broomfield, CO (US); Lisa A. Morgan, Blackfoot, ID (US)

(73) Assignee: Ricoh Company, Ltd., Tokyo (JP)

(*) Notice: Subject to any disclaimer, the term of this patent is extended or adjusted under 35 U.S.C. 154(b) by 509 days.

(21) Appl. No.: 13/185,202

(22) Filed: Jul. 18, 2011

(65) Prior Publication Data
US 2013/0021636 A1    Jan. 24, 2013

(51) Int. Cl.
*G06K 15/00* (2006.01)
(52) U.S. Cl.
CPC .................. *G06K 15/401* (2013.01)
(58) Field of Classification Search
CPC ................................. G06K 15/1856
USPC ................................ 358/1.14–1.16
See application file for complete search history.

(56) References Cited

U.S. PATENT DOCUMENTS 5,479,587 A * 12/1995 Campbell et al. ........... 358/1.17
6,038,033 A *  3/2000 Bender .................. G06K 15/02
                                                        358/1.1
2004/0095596 A1    5/2004 Rijavec
2009/0249017 A1* 10/2009 Prebble ................... G06F 12/08
                                                        711/170
2010/0053179 A1*  3/2010 Bellert .................. G06F 12/023
                                                        345/530
2010/0290078 A1* 11/2010 Taylor ..................... G06F 3/124
                                                        358/1.15
2011/0153931 A1*  6/2011 Bell, Jr. ................ G06F 3/0611
                                                        711/114

* cited by examiner

*Primary Examiner* — Henok A Shiferaw
(74) *Attorney, Agent, or Firm* — Duft Bornsen & Fettig LLP

(57) ABSTRACT

Methods and systems herein provide for efficiently resolving how a rasterizer responds to out of memory conditions when attempting to write raster data to a solid state memory. In one embodiment, a print controller determines that the solid state memory is no longer available for storing raster data. The print controller determines that a process is utilizing the shared memory to complete an operation, where completing the operation frees up a portion of the solid state memory. The print controller suspends the rasterizer from writing raster data to a hard disk, and waits for the process to complete the operation. The print controller then instructs the rasterizer to resume writing raster data to the solid state memory.

9 Claims, 5 Drawing Sheets

RESOLUTION OF OUT OF MEMORY CONDITIONS FOR SHARED MEMORY IN A PRINT CONTROLLER

FIELD OF THE INVENTION

The invention relates to the field of printing systems, and in particular, to efficiently resolving how a raster image processor responds to out of memory conditions when writing raster data for a print job to solid state memory.

BACKGROUND

Printers generally include a print controller that receives print data (e.g., Page Description Language (PDL) data), and a print engine. The print controller rasterizes the logical pages of the print job into bitmap images. In n-up printing, multiple logical pages reside on a printed page, or sheet side. The print controller assembles the bitmap images for the logical pages into a sheet side image. The sheet side image is then sent to the print engine for imprinting to a media, such as paper.

When storing the rasterized logical pages of the print job, it is generally much faster to store the rasterized pages in a solid state memory, such as a Random Access Memory (RAM). However, solid state memory is a finite resource and eventually the memory will become full. In addition, multiple processes executing on the print controller may be sharing data stored in the solid state memory. For example, a page rasterizer may store bitmap images of the logical pages to the solid state memory. A sheet side assembler may then read the bitmap images out of the solid state memory in order to build sheet side images for printing. After assembling a sheet side image, the portions of the solid state memory that store the bitmap images are freed for other uses, such as storing newly rasterized logical pages.

To handle out of memory conditions for the solid state memory, modern printers often include a mechanical hard disk drive for storing the rasterized pages as a fall-back. When the solid state memory is full, the rasterizer may automatically begin writing rasterized pages to the hard disk. However, writing data to the hard disk is slower than writing the data to the solid state memory. Thus, the rasterization process slows down when the hard disk is used to store raster data.

It thus remains a problem to efficiently respond to how a rasterizer handles out of memory conditions for solid state memory to improve the throughput of the rasterization process.

SUMMARY

Embodiments described herein provide for efficiently resolving how a rasterizer responds to out of memory conditions when attempting to write raster data to a solid state memory. In the embodiments provided, a determination is made that a process is about to complete an operation that will free up some of the solid state memory. The rasterizer is suspended from writing raster data to a mechanical hard disk until the process completes the operation, thus freeing up a portion of the solid state memory. The rasterizer then resumes the writing of rasterized pages to the solid state memory. This improves the throughput of the rasterization process.

In one embodiment, a print controller of a printer is disclosed. The print controller includes a control system and a rasterizer. The rasterizer determines that a solid state memory is no longer available for storing raster data, and transmits an out of memory error to the control system. The control system determines that a process is utilizing the solid state memory to complete an operation, where completing the operation frees up a portion of the solid state memory. The control system suspends the rasterizer from writing raster data to a mechanical hard disk, and waits for the process to complete the operation. The control system then instructs the rasterizer to resume writing raster data to the solid state memory.

In another embodiment, a side builder assembles sheet side images from the raster data. The control system determines that the side builder is waiting for raster data to assemble a sheet side image, and determines a number of logical pages remaining to complete the sheet side image. The control system then instructs the rasterizer to write the number of logical pages that remain to complete the sheet side image to the hard disk.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
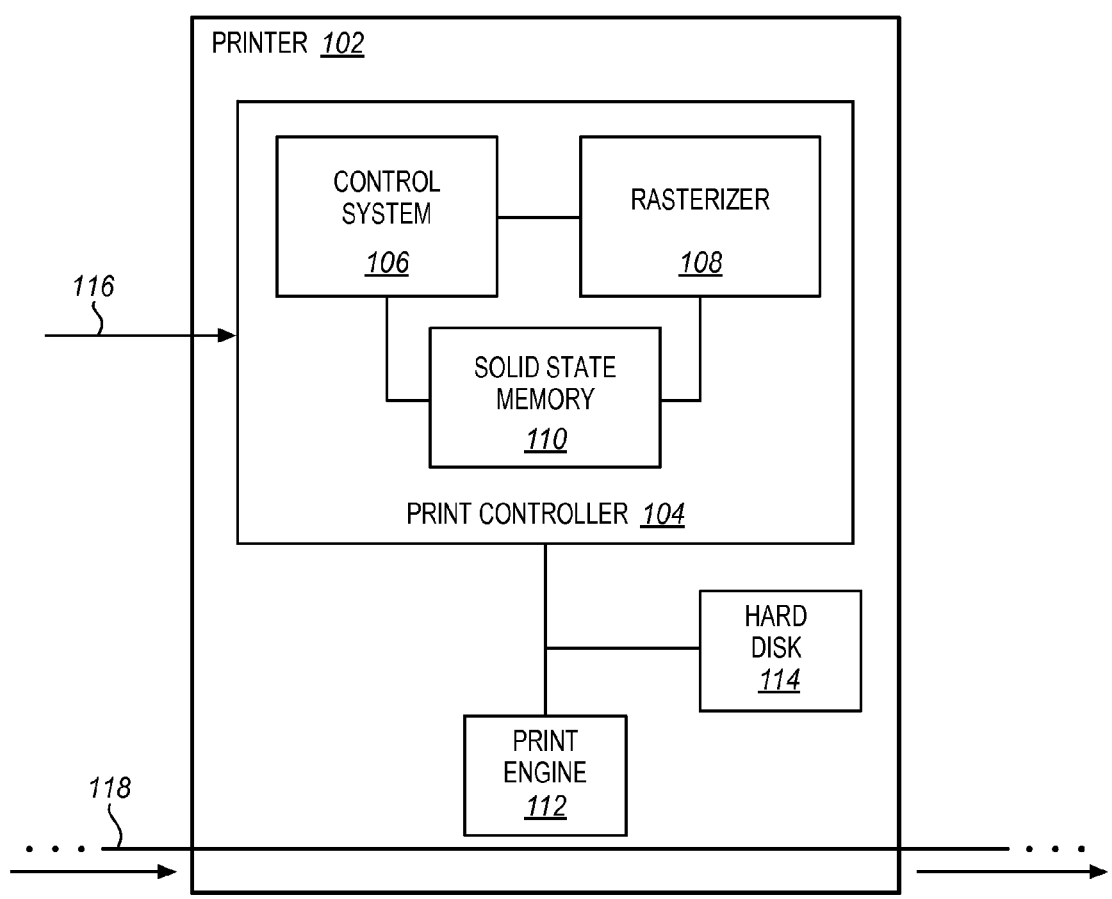
FIG. 1 is a block diagram of a printer in an exemplary embodiment.

FIG. 1 is a block diagram of a printer 102 in an exemplary embodiment. FIG. 1 also illustrates a media 118 for imprinting by printer 102. Printer 102 includes a print controller 104, a print engine 112, and a mechanical hard disk 114. In printer 102, controller 104 receives print data 116 for imprinting onto media 118. Print controller 104 may perform a number of data processing operations on print data 116, such as generating raster bitmaps of the logical pages of print data 116 before the bitmap data is transmitted to print engine 112. Print engine 112 imprints media 118 based on the bitmap data.

Print controller 104 may write raster data of print data 116 in solid state memory 110 and/or hard disk 114 during the printing process. Generally, writing and reading data to/from solid state memory 110 is much faster than writing and reading data to/from hard disk 114. Thus, solid state memory 110 is preferred over hard disk 114 when storing raster data. Also, a number of processes executing on print controller 104 may utilize the same solid state memory 110 and/or perform operations on the same raster data (e.g., rasterized pages of print data 116) stored in solid state memory 110. Therefore, solid state memory 110 may eventually become full. Print controller 104 may then write raster data to hard disk 114 until solid state memory 110 becomes available (e.g., some of solid state memory 110 is freed up). Solid state memory 110 may become available as processes operating within print controller 104 complete operations that allow raster data stored in solid state memory 110 to be deleted or freed.

In this embodiment, print controller 104 does not automatically write raster data to hard disk 114 when solid state memory 110 is full. Instead, print controller 104 determines if a process is about to complete an operation, where completing the operation frees up a portion of solid state memory 110. When a process utilizing solid state memory 110 is about to complete, it may be more efficient to temporarily suspend rasterizing pages of print data 116 instead of writing the raster data to hard disk 114. This improves the throughput of the rasterization process. An example of how print controller 104 may operate will be discussed in more detail with regard to FIG. 2.

Figure 2:
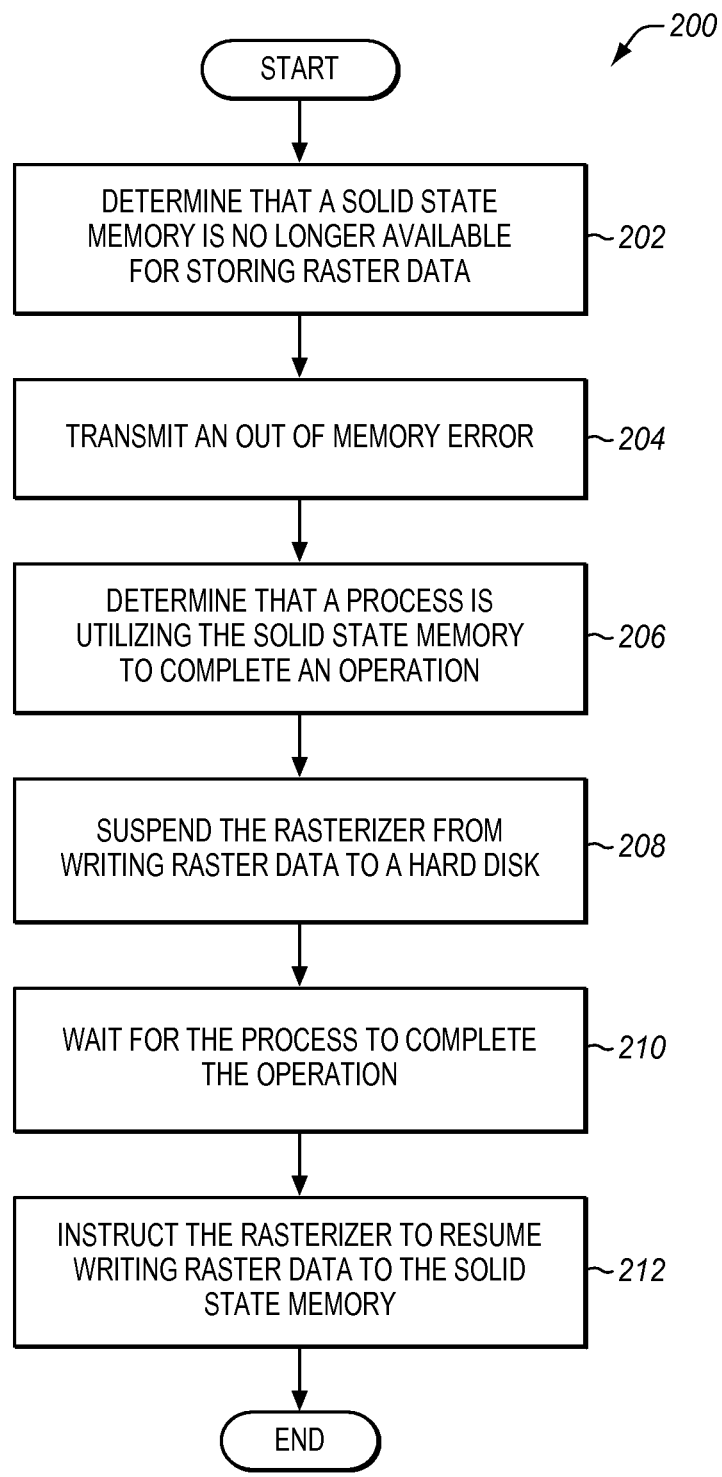
FIG. 2 is flow chart illustrating a method of efficiently resolving an out of memory condition for a rasterizer in an exemplary embodiment.

FIG. 2 is flow chart illustrating a method 200 of efficiently resolving an out of memory condition for a rasterizer 108 in an exemplary embodiment. The steps of method 200 will be described with respect to printer 102 of FIG. 1, although one skilled in the art will understand that method 200 may be performed by other systems not shown. The steps of the methods described herein are not all inclusive and may include other steps not shown. The steps may also be performed in an alternative order.

In step 202, rasterizer 108 determines that solid state memory 110 is no longer available for storing raster data for print data 116. As solid state memory 110 is a finite resource, eventually solid state memory 110 becomes full as rasterizer 108 generates bitmap images of pages of print data 116, and writes the bitmap images to solid state memory 110. Solid state memory 110 that is used to store the bitmap images is not freed until other processes sharing solid state memory 110 complete their tasks, such as processes that generate sheet side images based on the bitmap images stored in solid state memory 110 (a sheet side image is a bitmap of one or more logical pages on a side of media).

In step 204, rasterizer 108 transmits an out of memory error to control system 106 if solid state memory 110 is no longer available for storing raster data. In step 206, control system 106 determines that a process is utilizing solid state memory 110 to complete an operation, where completing the operation frees up a portion of solid state memory 110. For example, a process in print controller 104 may be assembling a sheet side image from one or more bitmap images stored in solid state memory 110. After the sheet side is assembled, the portions of solid state memory 110 storing the bitmap images are freed up for other processes that may use solid state memory 110.

In step 208, control system 106 suspends rasterizer 108 from writing raster data to hard disk 114. As writing to hard disk 114 is a slow process (e.g., a number of milliseconds) as compared to writing to solid state memory 110 (e.g., some tens of microseconds), it may be more efficient for control system 106 to temporarily suspend rasterizer 106 from writing raster data to hard disk 114 and wait for a process using memory 110 to complete its operation than to write the raster data to hard disk 114.

In step 210, control system 106 waits for the process to complete the operation that frees up a portion of solid state memory 110. In step 212, control system 106 instructs rasterizer 108 to resume writing raster data to memory 110 in response to the process completing the operation. Instead of automatically writing raster data to hard disk 114 when solid state memory 110 is no longer available, control system 106 checks to see if an operation is in progress that may free up a portion of solid state memory 110. As writing to hard disk 114 is slower than writing to solid state memory 110, it may be more efficient to wait until a portion of solid state memory 110 is available than to immediately fall back to writing raster data to hard disk 114. This improves the throughput of the rasterization process in printer 102.

In some embodiments, the operation is performed by a side builder that is operable to assemble sheet side images from the raster data. In this embodiment, control system 106 may determine that the side builder is waiting for raster data to assemble a sheet side image. For instance, in 4-up printing, logical pages one through three for the sheet side may already be rasterized while page four is pending. Thus, the side builder is waiting for page four. In this embodiment, control system 106 instructs rasterizer 108 to write raster data directly to hard disk 114 instead of waiting for the side builder to complete the sheet side image. Control system 106 may determine how many logical pages remain to complete the sheet side image, and instruct rasterizer 108 to write the remaining pages directly to hard disk 114. It may be more efficient to write the remaining pages directly to hard disk 114 instead of waiting for solid state memory 110 to be freed up, as control system 106 recognizes that the remaining pages are needed by the sheet side assembler to complete the sheet side image.

EXAMPLE

Figure 3:
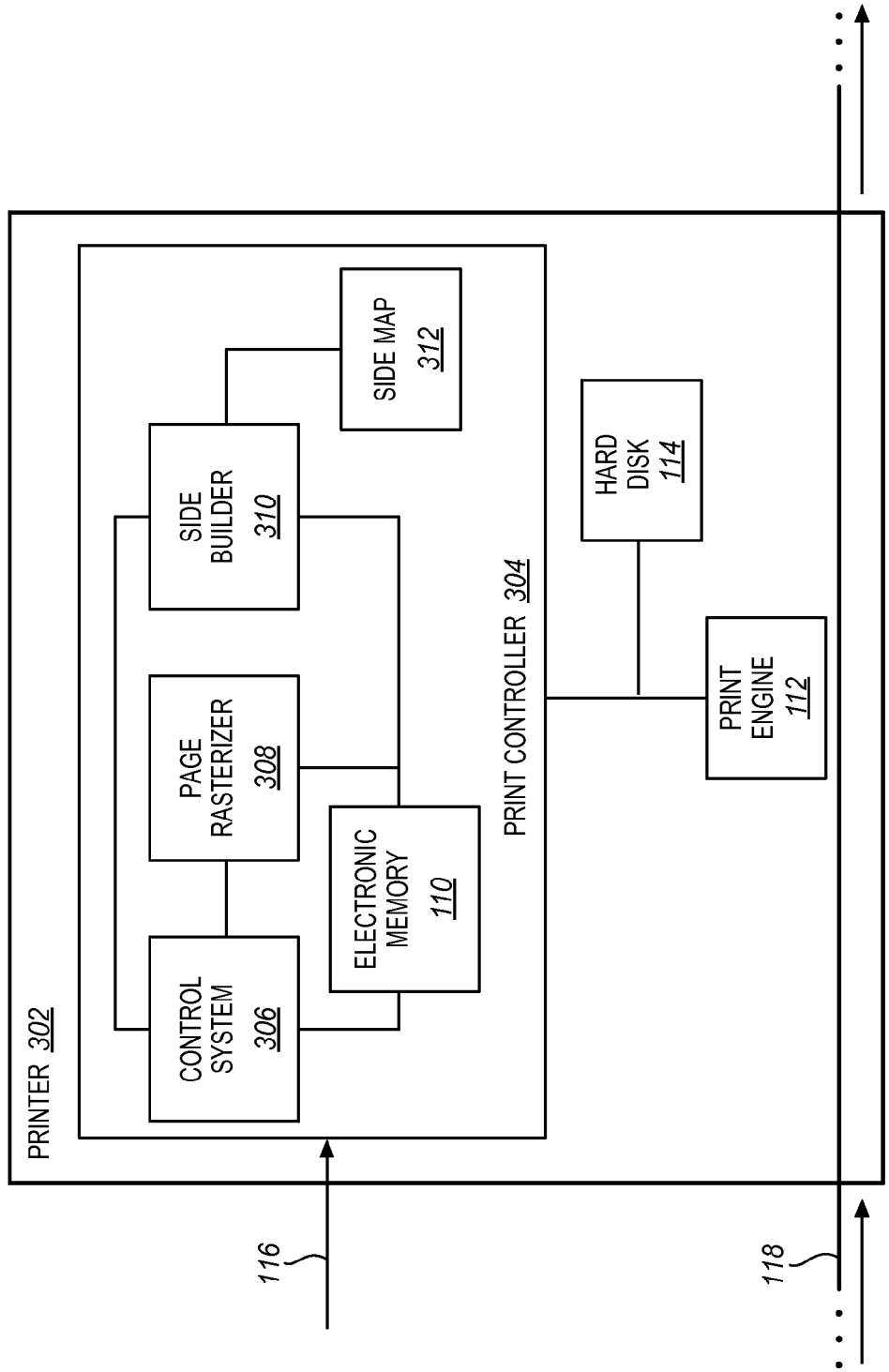
FIG. 3 is a block diagram of another printer in another exemplary embodiment.

FIG. 3 is a block diagram of another printer 302 in another exemplary embodiment. Similar to printer 102 of FIG. 1, printer 302 imprints media 118. Printer 302 includes a print controller 304, print engine 112, and hard disk 114. In print controller 304, a page rasterizer 308 "rips" logical pages of a print job (e.g., received via print data 116) into bitmap images. Page rasterizer 308 will rip the pages to solid state memory 110 if solid state memory 110 is available. Rasterizer 308 may also rip the pages to hard disk 114 when solid state memory 110 is full and/or not available. In n-up printing, a sheet side image may be assembled from multiple ripped pages. A side builder 310 locates ripped pages for a sheet side image that is stored solid state memory 110 and/or stored in hard disk 114. The sheet side image is built and written to side map 312, which typically is a separate memory (e.g., fast RAM) in addition to solid state memory 110. After a sheet side image is complete (or a partial sheet side image is complete), side builder 310 notifies control system 306. This allows control system 306 to free up the bitmap images stored in solid state memory 110. The sheet side image is then transmitted to print engine 112 for printing.

Figure 4:
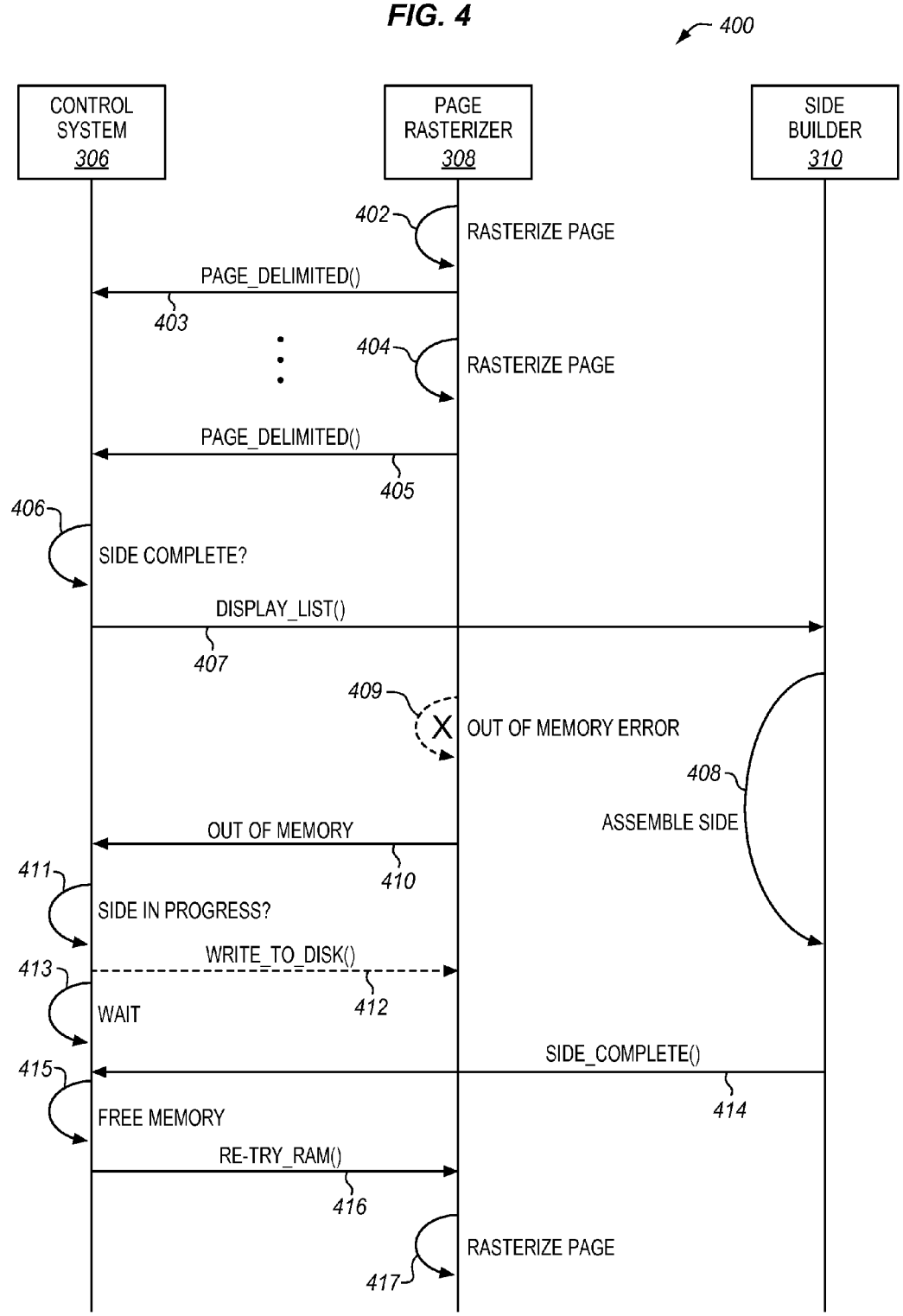
FIG. 4 is an example of a communication and processing flow diagram for the printing system of FIG. 3 in an exemplary embodiment.

FIG. 4 is an example of a communication and processing flow diagram 400 for printer 302 of FIG. 3 in an exemplary embodiment. FIG. 4 illustrates the types of communications and processing activities that may be performed by control system 306, page rasterizer 308, and side builder 310 in order to more efficiently handle out of memory errors encountered by page rasterizer 308. The particular communications and processing activities shown in FIG. 4 may include more or fewer communications and/or activities as a matter of implementation.

After receiving a print job (e.g., via print data 116), page rasterizer 308 begins rasterizing pages of the print job. Although only one page rasterizer 308 is shown in FIG. 3, print controller 106 may include any number of page rasterizers that operate substantially in parallel. After a page is rasterized (see process 402 of FIG. 4), page rasterizer 308 transmits a Page_delimited( ) message (403) to control system 306. A page_delimited( ) message indicates to control system 306 information about the rasterized page, such as its location in memory 110 and/or hard disk 114. Page_delimited( ) allows control system 306 to track the progress of rasterizing the logical pages for the print job. As pages are rasterized (404) and page_delimited( ) messages (405) are sent to control system 306, control system 306 will eventually determine (406) that either a full side or a partial side of logical pages have been rasterized and therefore, a full or partial side of bitmap images are ready for assembly into a sheet side image. For instance, if 4-up printing is defined for a sheet side, then control system 306 will track the progress of each of the four logical pages for the sheet side and notify side builder 310 that a full and/or partial side of bitmap images is ready for assembly into a sheet side image.

After a full side of pages has been rasterized, control system 306 transmits a display_list( ) message to side builder 310. Although only one side builder 310 is shown in FIG. 3, print controller 304 may include any number of side builders that operate substantially in parallel. The display_list( ) message 407 notifies the side builder 310 the location (either stored in solid state memory 110 or stored on hard disk 114) of the rasterized pages generated by page rasterizer 308. Using the display_list( ) information, side builder 310 assembles (408) a sheet side image and stores the image in side map 312. In some cases, control system 306 may indicate information to side builder 310 about a partial side that is ready to be assembled. For example, instead of waiting for all of the rasterized pages for a complete side, control system 306 may determine that some of the rasterized pages are ready for assembly by side builder 310 into a partial side. This allows side builder 310 to partially complete a sheet side image and also allows some of solid state memory 110 to be freed up for other uses.

At some point, page rasterizer 308 may determine that solid state memory 110 is full (409) and transmit an out_of memory( ) error message (410) to control system 306. After transmitting the out_of memory( ) message, page rasterizer 308 waits for instructions from control system 306. In response to receiving the out_of memory( ) message, control system 306 attempts to determine if a side is currently being assembled by side builder 310. If a side is not in progress, then control system 306 assumes that solid state memory 110 is unavailable for storing raster data. In this case, control system 306 transmits instructions (412) to page rasterizer 308 to rasterize one or more pages to hard disk 114. This happens when solid state memory 110 fills with one or more pages (due to parallel page rasterizers) where no page rasterize is able to complete its page due to contention for solid state memory 110. If a side is in progress, then control system 306 waits (413) until it receives a side_complete( ) message (414) from side builder 310. A side_complete( ) message includes information about the sheet side image that was built. As sheet side images are stored at side map 312, this allows control system 306 to free-up (415) solid state memory 110 that stores the rasterized pages for the completed (or partial) sheet side image. After freeing up some of solid state memory 110, control system 306 transmits a message (416) to page rasterizer 308 to re-try ripping pages of the print job to solid state memory 110. Page rasterizer 308 continues rasterizing (417) one or more logical pages of the print job directly to solid state memory 110.

Figure 5:
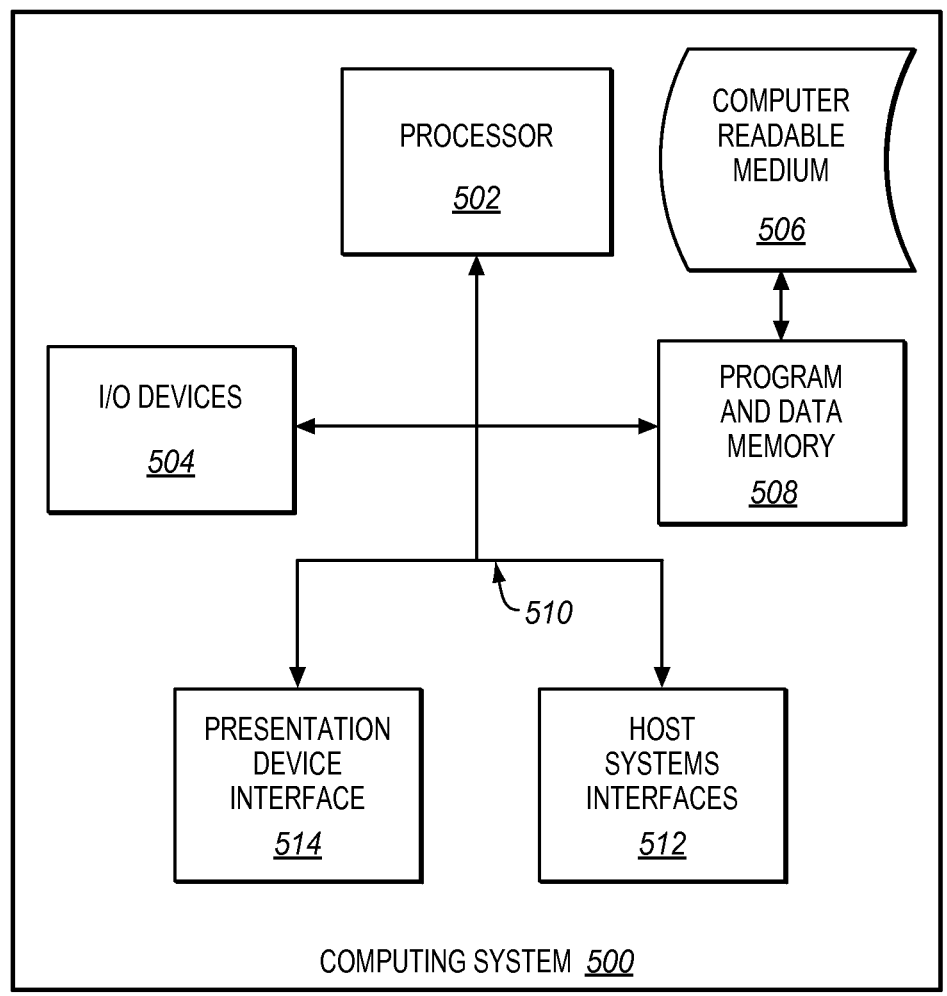
FIG. 5 illustrates a computing system in which a computer readable medium may provide instructions for performing the method of FIG. 2 and the communication and processing flows of FIG. 4 in an exemplary embodiment.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 5 illustrates a computing system in which a computer readable medium may provide instructions for performing the method of FIG. 2 and the communication and processing flows of FIG. 4 in an exemplary embodiment.

Furthermore, the invention can take the form of a computer program product accessible from a computer-usable or computer-readable medium 506 providing program code for use by or in connection with a computer or any instruction execution system. For the purposes of this description, a computer-usable or computer readable medium 506 can be any apparatus that can contain, store, communicate, or transport the program for use by or in connection with the instruction execution system, apparatus, or device.

The medium 506 can be an electronic, magnetic, optical, electromagnetic, infrared, or semiconductor system (or apparatus or device) or a propagation medium. Examples of a computer-readable medium 506 include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution.

Input/output or I/O devices 504 (including but not limited to keyboards, displays, pointing devices, etc.) can be coupled to the system either directly or through intervening I/O controllers.

Network adapters may also be coupled to the system to enable the data processing system to become coupled to other data processing systems, such a through host systems interfaces 512, or remote printers or storage devices through intervening private or public networks. Modems, cable modem and Ethernet cards are just a few of the currently available types of network adapters.

Although specific embodiments were described herein, the scope of the invention is not limited to those specific embodiments. The scope of the invention is defined by the following claims and any equivalents thereof.

We claim:

1. A print controller implemented by a processor and a memory of a printer, the print controller comprising:
a control system; and
a rasterizer that generates raster data for a print job, sends the raster data to a solid state memory, determines that the solid state memory is no longer available for storing the raster data, and transmits an out of memory error to the control system, wherein the control system determines whether a process of a side builder is generating a sheet side image based on raster data in the solid state memory, and determines whether the side builder is expected to free up a portion of the solid state memory upon completion of the sheet side image, and:

if a sheet side image is not in progress at the side builder, the control system determines that the solid state memory is not available for storing raster data, and transmits instructions to the rasterizer to rasterize one or more pages to a mechanical hard disk; and if a sheet side image is in progress at the side builder, the control system waits for a side complete message from the side builder, and instructs the rasterizer to write raster data to the solid state memory in response to the side complete message;

wherein the control system transmits a display list to the side builder indicating locations of the raster data; and the display list indicates whether raster data is stored at the solid state memory or the mechanical hard disk.

2. The print controller of claim 1, wherein:

the control system is further operable, responsive to determining that the solid state memory is no longer available, to determine that the side builder is waiting for raster data to assemble the sheet side image, to determine a number of rasterized logical pages (n) remaining to complete the sheet side image, to instruct the rasterizer to write (n) rasterized logical pages to the mechanical hard disk, to determine that the sheet side image has been completed thereby freeing a portion of the solid state memory, and to instruct the rasterizer to write additional raster data to the solid state memory.

3. The print controller of claim 2 wherein:

the control system is further operable to determine that the side builder is not waiting for raster data to assemble the sheet side image, and to suspend the rasterizer from writing raster data to the mechanical hard disk in response to determining that the side builder is not waiting for raster data to assemble the sheet side image.

4. A method operable on a print controller of a printer, the method comprising:

determining that a solid state memory is no longer available for storing raster data generated by a rasterizer for a print job;

transmitting an out of memory error;

determining whether a process of a side builder is generating a sheet side image based on raster data in the solid state memory, and is expected to free up a portion of the solid state memory upon completion of the sheet side image; and if a sheet side image is not in progress at the side builder:

determining that the solid state memory is not available for storing raster data; and transmitting instructions to the rasterizer to rasterize one or more pages to a mechanical hard disk; and if a sheet side image is in progress at the side builder:

waiting for a side complete message from the side builder; and instructing the rasterizer to write raster data to the solid state memory in response to the side complete message;

transmitting a display list to the side builder indicating locations of the raster data; and the display list indicates whether raster data is stored at the solid state memory or the mechanical hard disk.

5. The method of claim 4, wherein the method further comprises:

determining that the process is waiting for raster data to assemble the sheet side image responsive to determining that the solid state memory is no longer available;

determining a number of rasterized logical pages (n) remaining to complete the sheet side image;

writing (n) rasterized logical pages to the mechanical hard disk;

determining that the sheet side image has been completed thereby freeing a portion of the solid state memory; and instructing the rasterizer to write additional raster data to the solid state memory.

6. The method of claim 5 further comprising:

determining that the process is not waiting for raster data to assemble the sheet side image; and suspending a writing of raster data to the mechanical hard disk in response to determining that the process is not waiting for raster data to assemble the sheet side image.

7. A non-transitory computer readable medium embodying programmed instructions which, when executed by a processor of a print controller, are operable for performing a method, the method comprising:

determining that a solid state memory is no longer available for storing raster data generated by a rasterizer for a print job;

transmitting an out of memory error;

determining whether a process of a side builder is generating a sheet side image based on raster data in the solid state memory, and is expected to free up a portion of the solid state memory upon completion of the sheet side image; and if a sheet side image is not in progress at the side builder:

determining that the solid state memory is not available for storing raster data; and transmitting instructions to the rasterizer to rasterize one or more pages to a mechanical hard disk; and if a sheet side image is in progress at the side builder:

waiting for a side complete message from the side builder; and instructing the rasterizer to write raster data to the solid state memory in response to the side complete message;

transmitting a display list to the side builder indicating locations of the raster data; and wherein the display list indicates whether raster data is stored at the solid state memory or the mechanical hard disk.

8. The computer readable medium of claim 7, wherein the method further comprises:

determining that the process is waiting for raster data to assemble the sheet side image responsive to determining that the solid state memory is no longer available;

determining a number of rasterized logical pages (n) remaining to complete the sheet side image; writing (n) rasterized logical pages to the mechanical hard disk;

determining that the sheet side image has been completed thereby freeing a portion of the solid state memory; and instructing the rasterizer to write additional raster data to the solid state memory.

9. The computer readable medium of claim 8, wherein the method further comprises:

determining that the process is not waiting for raster data to assemble the sheet side image; and suspending a writing of raster data to the mechanical hard disk in response to determining that the process is not waiting for raster data to assemble the sheet side image.

* * * * *